R. W. HINDERLITER.
FEEDER AND LOADER.
APPLICATION FILED JAN. 21, 1911.
990,874.
Patented May 2, 1911.
3 SHEETS—SHEET 1.
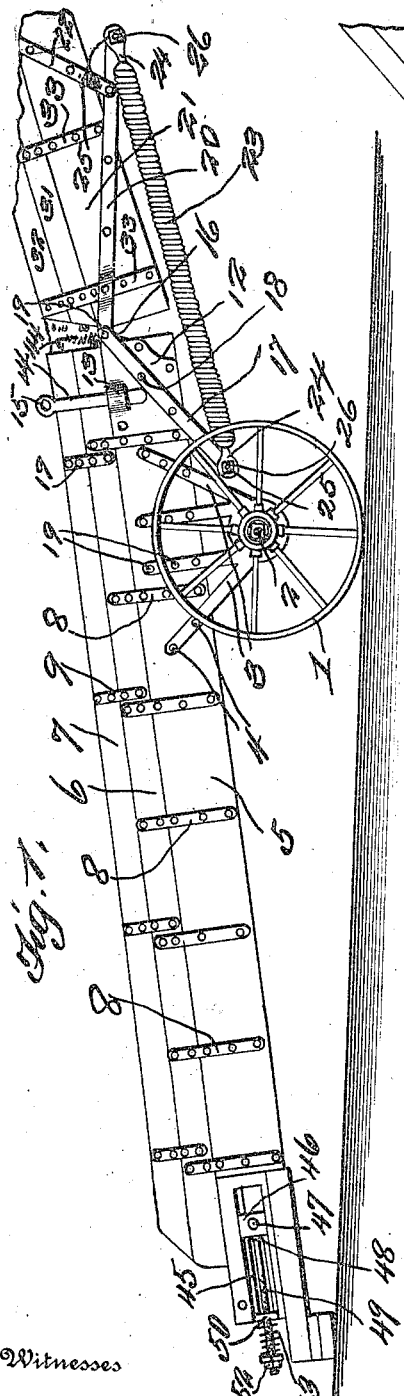
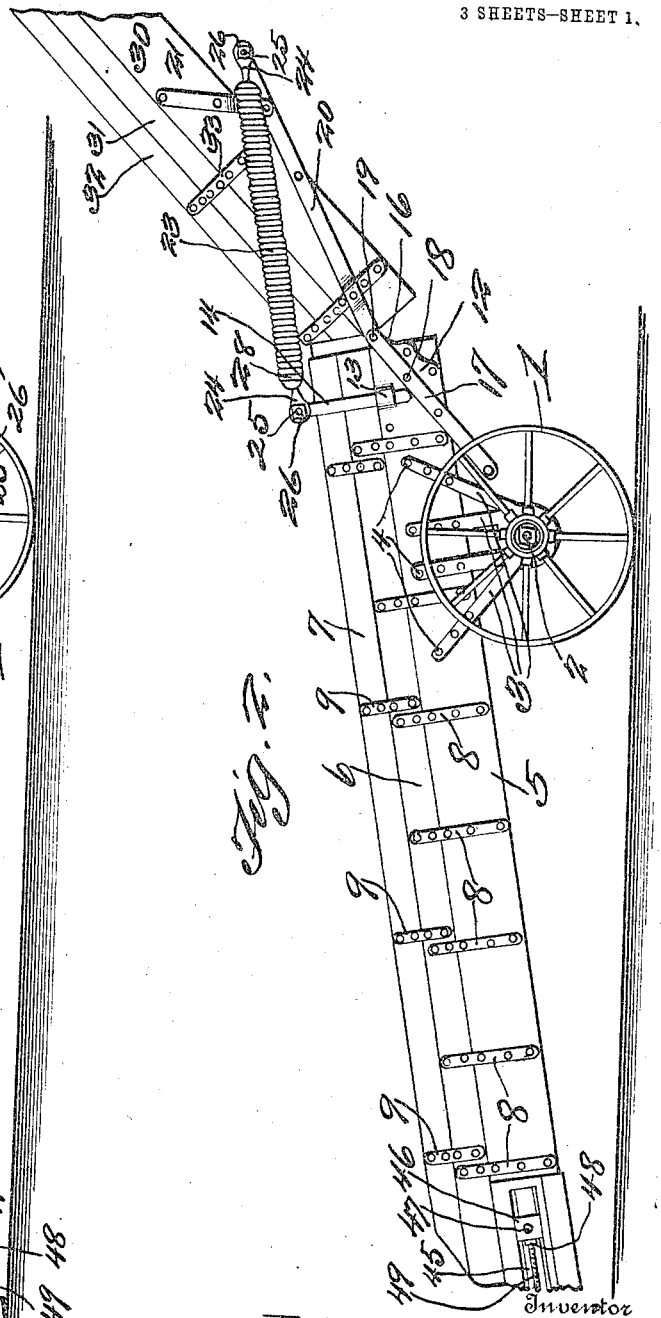

R. W. HINDERLITER.
FEEDER AND LOADER.
APPLICATION FILED JAN. 21, 1911.
990,874.
Patented May 2, 1911.
3 SHEETS—SHEET 2.
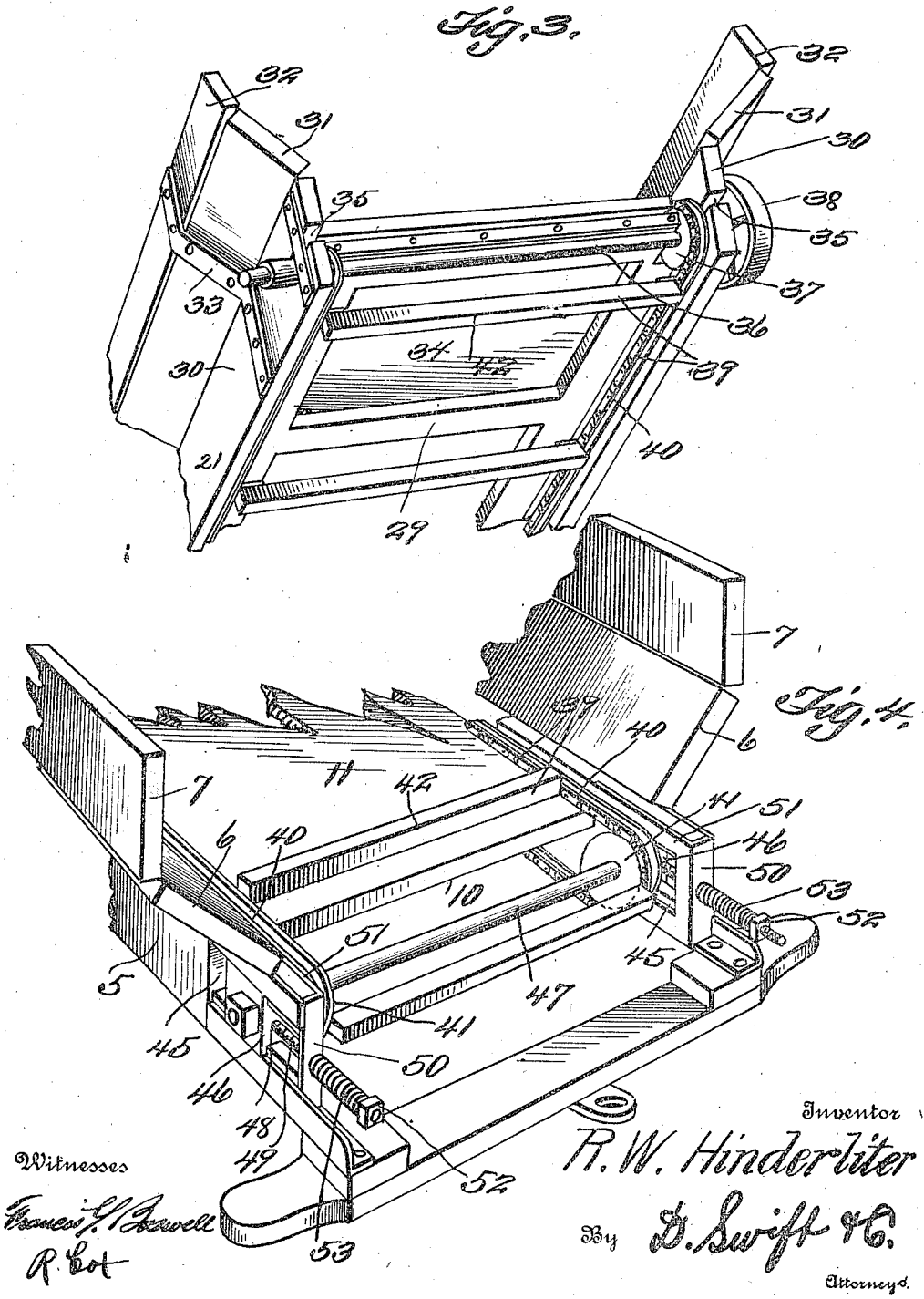

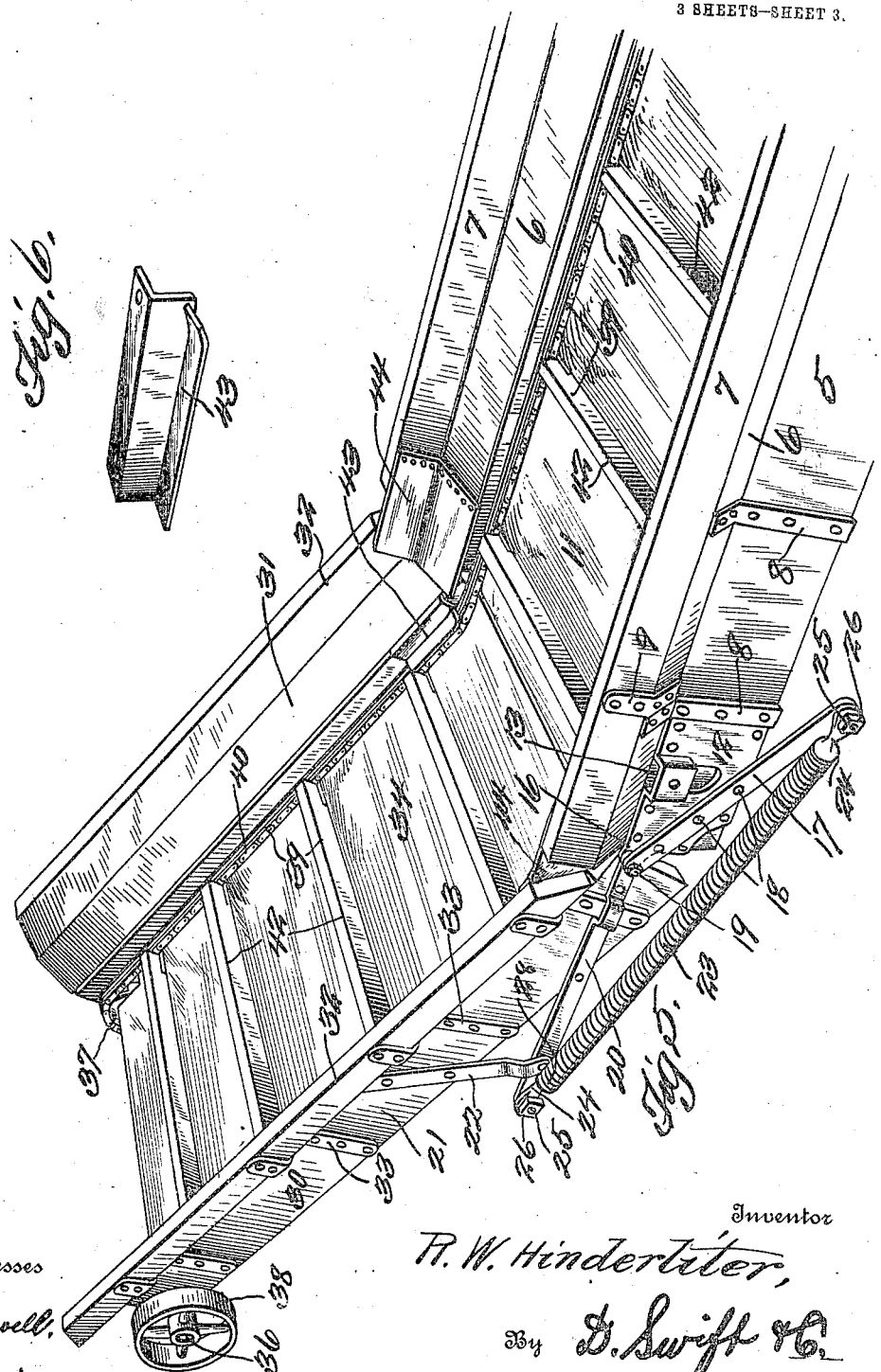

UNITED STATES PATENT OFFICE.

RICHARD W. HINDERLITER, OF ELLINWOOD, KANSAS.

FEEDER AND LOADER.

990,874.      Specification of Letters Patent.      Patented May 2, 1911.

Application filed January 21, 1911. Serial No. 603,887.

*To all whom it may concern:*

Be it known that I, RICHARD W. HINDERLITER, a citizen of the United States, residing at Ellinwood, in the county of Barton and State of Kansas, have invented a new and useful Feeder and Loader; and I do hereby declare the following to be a full, clear, and exact description of the invention, such as will enable others skilled in the art to which it appertains to make and use the same.

This invention relates to the art of feeders and the like, and it particularly pertains to a new and useful feeder, adapted for use principally in connection with threshing machines, whereby the grain may be elevated and fed to the hopper of the thresher.

The object of the invention is to provide a novel form of extension hingedly connected at one end of the feeder.

A further object of the invention is to provide means for holding the feeder extension yieldably in various positions.

A further object of the invention is the provision of an elevator belt operable between the main body of the feeder and the extension. This endless elevator belt comprises chains having transversely arranged bars connected between them, for moving the grain through the feeder.

A further feature of the invention is to provide angular plates arranged adjacent the joint between the extension and the main body of the feeder, under which the chains travel, in order to prevent their displacement.

This feeder may not only be used in connection with threshers, but may be utilized for feeding or loading wagons, lofts or the like as well.

The invention comprises further features and combination of parts hereinafter set forth, shown in the drawings, and claimed.

In the drawings:—Figure 1 is a side elevation of the feeder, showing the improved hingedly connected extension. Fig. 2 is a view similar to Fig. 1, showing the hingedly connected extension in a different position. Fig. 3 is a view in perspective, showing the upper rear end of the extension. Fig. 4 is a view in perspective, showing the lower forward end of the main body of the feeder. Fig. 5 is a view in perspective, showing on an enlarged scale the entire hingedly connected extension, and further illustrating the interior of the extension, and its connection with the rear end of the main body of the feeder. Fig. 6 is a detail view of a portion of the extension, showing the angular plate under which one of the chains pass.

In regard to the accompanying drawings, 1 designates the wheels, upon which the feeder is supported, by virtue of the axle 2 and the brackets 3. The brackets 3 are secured to the main body of the feeder by the bolts 4, as shown in Figs. 1 and 2. The main body of the feeder comprises a trough shaped member 5. The sides of the trough shaped member are provided with a pair of extension boards 6 and 7. The boards 6 are secured to the sides of the trough 5 by the bars or plates 8, while the boards 7 are secured to the boards 6 by the plates 9. As illustrated in Fig. 4 of the drawings the bottom of the trough is in the form of a frame 10, over which a sheet of galvanized iron 11 is arranged, thus providing a smooth unobstructed surface, over which the carrier travels.

Secured to the sides at the rear end of the trough 5 are the plates 12, which are formed with sockets 13. Receivable by the sockets are the standards 14, which terminate in eyes 15. The plates 12 are provided with short extensions at their upper right hand corners, as shown in Figs. 1 and 2. Extending diagonally across the plates 12 are the bars 17, there being bolts 18 for securing them in position. The upper ends of the bars 17 and the extensions 16 are provided with registered apertures to receive the bolts 19, there being bars 20 pivoted upon said bolt. The bars 20 are bolted or otherwise secured to the sides of the hingedly connected extension trough 21. Brace bars 22 are bolted or otherwise secured to the extension trough and at angles to the bars 20, with their lower ends bolted or otherwise secured to the bars 20. In Fig. 1, the coil springs 23 are connected to and between the ends of the bars 17 and 20, by virtue of the apertured members 24 and the bolts and nuts 25 and 26. When the spring 23 is connected as shown in Fig. 1, the tendency of the extension trough is to remain in a downward position, and to a certain degree may be held yieldably in an upper position. In Fig. 2 the end 28 of the spring is connected to the standard 14 at the apertured end thereof by means of the bolt and nut 25 and 26. When the spring is positioned as shown in Fig. 2, the extension trough is held at a greater angle than that shown in Fig. 1, by virtue of the fact that the spring 23 is arranged upon the other side of the pivot or hinged connection between the extension trough and the main body of the feeder.

The extension trough is constructed similar to the main body of the feeder, namely, the bottom of the extension trough is in the form of a frame work, consisting of the transversely arranged bars 29, and projecting upwardly from the frame work are the sides 30, to which the extension boards 31 and 32 are connected. The boards 31 are secured to the sides 30 by the bars 33, which also support the boards 32 in position. The frame forming the bottom of the extension trough is provided with a sheet of galvanized iron 34, over which the carrier also travels. The upper ends of the sides 30 of the extension trough are slotted, as shown in Fig. 3. Arranged transversely of the upper end of the extension trough, and in the slots 35 is the shaft 36, on each end portion of which a sprocket 37 is arranged. On one end of the shaft 36 beyond one of the sides 30 of the extension trough a pulley 38 is mounted, to which means (not shown) may be connected or belted, for rotating the shaft 36.

The carrier 39 comprises the endless sprocket chains 40, which travel over the sprockets 37 and the sprockets 41, as shown in Figs. 3 and 4. Connecting the chains 40 are the bars 42, which constitute the means for feeding the grain up the galvanized iron bottom of the main body of the feeder and extension trough. Upon the interior of the extension trough at its lower forward end and at the sides thereof angular plates are disposed. Under the angular plates 43 the sprocket chains 40 move, in order to hold the carrier adjacent the bottom of the trough 5 and the extension trough, as shown in Fig. 5. Secured to the sides and the extension boards 6 and 7 of the main body of the feeder, as shown in Fig. 5, are sheets of galvanized iron 44, which extend over the gap or space between the main body of the feeder and the extension trough, in order to prevent the grain from falling through the sides of the feeder.

The lower forward ends of the main body of the feeder are provided with slotted portions 45, thus constituting guides for the sliding blocks 46, in which the shaft 47 is journaled. The sprockets 41 are carried by the shaft 47, as shown in Fig. 4. Swiveled to the blocks 46 as at 48 are the screws 49, which are extended through the angled ends 50 of the plates 51, and on their ends nuts 52 are applied. By the nuts 52, the tension of the springs 53 (which are arranged between the angled ends 50 and the said nuts) may be governed. By the arrangement of the sliding blocks, the screws 49, the springs 53 and the nuts 52, the carrier is held yieldably in position. For example if the carrier becomes stuck, or is feeding a heavy load of grain through the trough, the springs will yield, until the strain upon the carrier is relieved.

From the foregoing, it is clearly evident that a novel form of apparatus for feeding threshing machines, or loading wagons, lofts or the like, has been devised, and one which has been found to be practical in its construction and operation.

The invention having been set forth, what is claimed as new and useful is:—

1. In a feeding apparatus, a main trough body having plates secured to the sides at one end thereof, said plates having extensions, bars secured diagonally across the plates with their ends in registration with the extension of the plates, an extension trough having bars arranged diagonally thereof, with their ends pivoted between the first bars and the extensions of the said plates, braces for the second bars, and springs connected between the first and second bars for holding the extension troughs yieldably in different positions.

2. In a feeding apparatus, a main trough body having plates secured to the sides at one end thereof, said plates having extensions, bars secured diagonally across the plates with their ends in registration with the extension of the plates, an extension trough having bars arranged diagonally thereof, with their ends pivoted between the first bars and the extensions of the said plates, braces for the second bars, said plates having sockets, standards receivable in the sockets, and springs connectable between one end of the second bars and the standards, or between one end of the second bars and one end of the first bars, so as to arrange the springs on either side of the hinged connection, whereby the extension trough may be held yieldably in different positions.

In testimony whereof I have signed my name to this specification in the presence of two subscribing witnesses.

RICHARD W. HINDERLITER.

Witnesses:
Geo. W. Meggers,
Gustav Millies.